(12) United States Patent
Kuo

(10) Patent No.: US 6,647,732 B2
(45) Date of Patent: Nov. 18, 2003

(54) GAS TURBINE ENGINE WITH COMPRESSOR AND TURBINE INSIDE A HOLLOW SHAFT

(75) Inventor: Chii-Ron Kuo, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 29 days.

(21) Appl. No.: 09/953,273

(22) Filed: Sep. 17, 2001

(65) Prior Publication Data

US 2003/0051484 A1 Mar. 20, 2003

(51) Int. Cl.⁷ ................................................. F02C 3/04
(52) U.S. Cl. .............................. 60/804; 60/805; 415/91
(58) Field of Search .......................... 60/804, 805, 915; 415/91

(56) References Cited

U.S. PATENT DOCUMENTS

| | | | | |
|---|---|---|---|---|
| 2,831,320 A | * | 4/1958 | Duncan | ..................... 60/201 |
| 3,635,577 A | * | 1/1972 | Dee | ............................ 415/79 |

* cited by examiner

*Primary Examiner*—Ehud Gartenberg
(74) *Attorney, Agent, or Firm*—Rabin & Berdo, P.C.

(57) ABSTRACT

The present invention relates to a turbine engine, wherein compressor rotor blades and turbine rotor blades set around the interior circular surface of a hollow revolving shaft while compressor stator blades and turbine stator blades are set around the exterior circular surface of an inner engine case inside the hollow revolving shaft. By using the present invention, the configuration of the turbine engine can be compact, and the volume can be substantially reduced. Besides, the stiffness of the rotor blades can be increased, and efficiency of the compressor, the burner, the turbine, and the whole engine can be increased.

7 Claims, 2 Drawing Sheets

GAS TURBINE ENGINE WITH COMPRESSOR AND TURBINE INSIDE A HOLLOW SHAFT

BACKGROUND OF THE INVENTION

1. Field of the Invention

The present invention relates to a turbine engine, especially to a gas turbine engine having small volume and high efficiency.

2. Description of the Prior Art

Since a turbine engine was invented, compressor rotor blades and turbine rotor blades have been set around the exterior circular surface of a revolving shaft while compressor stator blades and turbine stator blades are set around the interior circular surface of a engine case. Disadvantages resulted from the above design are:

(1) Heat loss and the clearance between the blades and the engine case make heat efficiency of the system lower;

(2) Additional space for the burner is required;

(3) The revolving shaft is small in diameter and low in stiff;

(4) Blades are easy to be damaged;

(5) The demand of compact design can't be achieved; and (6) Noise can't be reduced efficiently.

The inventor of the present invention ruminated over the disadvantages resulted from the habitually used turbine engines, and earnestly deliberated the way of improvement and innovation. After studying hard for a long period, the inventor eventually succeeded in inventing the present invention, a gas turbine engine having high efficiency and making a breakthrough among traditional configurations.

SUMMARY OF THE INVENTION

The first purpose of the present invention is to provide a gas turbine engine, which makes a breakthrough among the configuration of traditional turbine engines such that the volume is reduced substantially in and engine efficiency is increased substantially.

The second purpose of the present invention is to provide a gas turbine engine, wherein a burner is set inside the revolving shaft directly, and can be designed as a can-shape combustion chamber to reduce usage room. Besides, the burner is included inside the revolving shaft such that the problem of heat loss can be improved with effect.

The third purpose of present invention is to provide a gas turbine engine, wherein blades are set around the interior surface of the revolving shaft to increase the diameter of the revolving shaft. The revolving shaft is not easy to deform, and can be operated with high stability of the system under the condition that the critical rotation speed is risen for one order.

The gas turbine engine which can achieve the purposes described above is mainly composed of compressor rotor blades and several turbine rotor blades set around interior circular surface of the revolving shaft, and compressor stator blades and several turbine stator blades set on the inner engine case.

BRIEF DESCRIPTION OF THE DRAWINGS

The drawings disclose an illustrative embodiment of the present invention which serves to exemplify the various advantages and objects hereof, and are as follows.

DIAGRAM REMARKS

Figure 1:
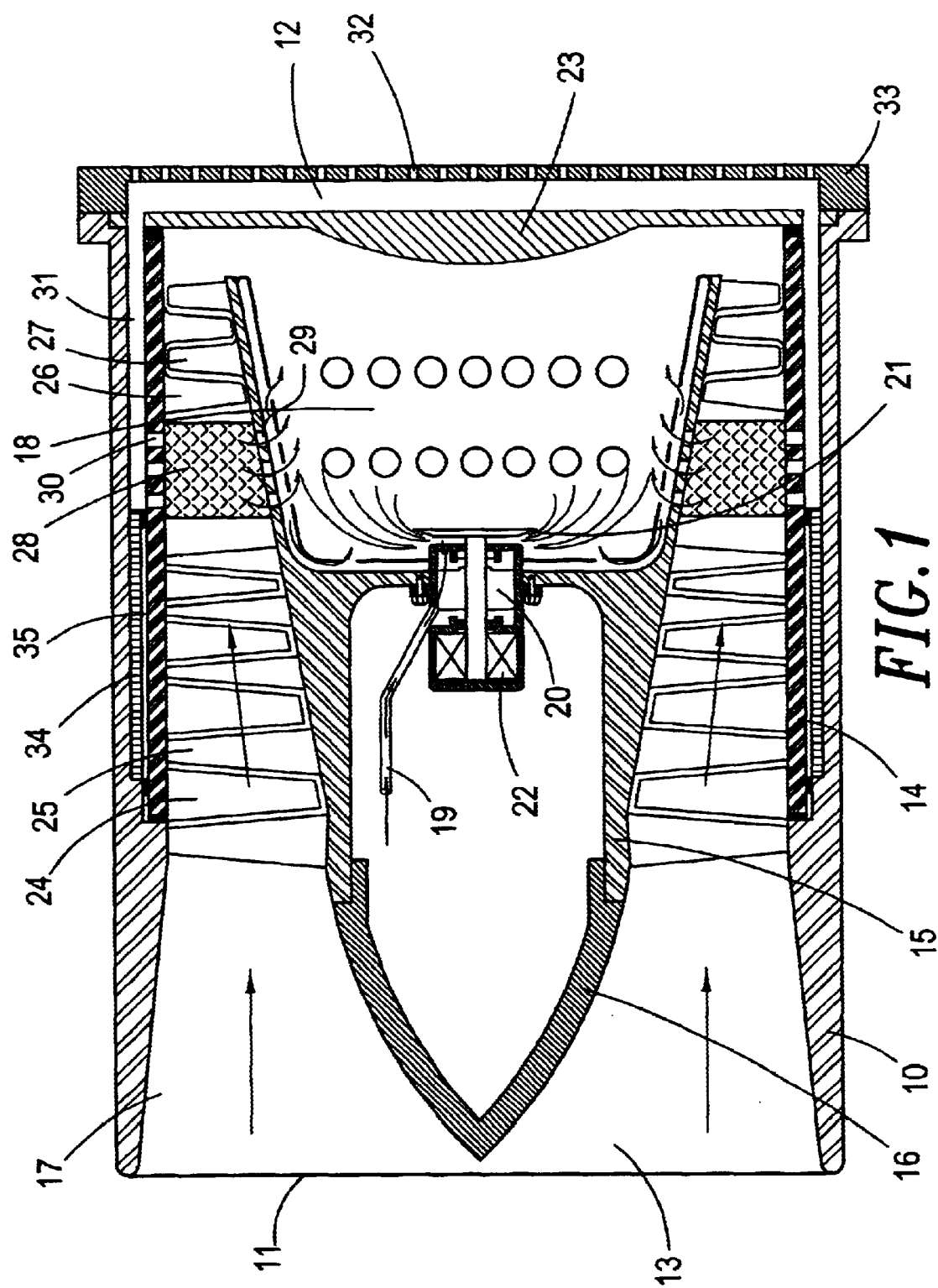
FIG. 1 is the axial sectional diagram of the present invention, a gas turbine engine, under intake process.

10 Outer engine case
11 Intake end
12 Exhaust end
13 Central channel
14 Hollow shaft
15 Inner engine case
16 Intake nose
17 Intake way
18 Burner
19 Fuel piping
20 Fuel pressure blade
21 Sprayer
22 Electromagnetic valve
23 Cover
24 Compressor rotor blade
25 Compressor stator blade
26 Turbine rotor blade
27 Turbine stator blade
28 Heat Exchanger
29 First hole
30 Second hole
31 Exhaust way
32 Exhaust hole
33 Exhaust cover
34 Electric generator
35 Air bearing

DETAILED DESCRIPTION OF THE PREFERRED EMBODIMENT

Referring to every drawing, the gas turbine engine provided from the present invention mainly comprises an outer engine case 10 having a center channel 13 wherein both ends are respectively an intake end 11 and an exhaust end 12, and an exhaust cover 33 having several exhaust holes 32 covered to the exhaust end 12. Besides, a hollow revolving shaft 14 is suspended and supported at the interior circular surface of the outer engine case 10, and a cover 23 is set at the opening of the rear end of the revolving shaft 14 regarding to the intake direction to enclose the opening. An inner engine case 15 is suspended and supported inside the hollow shaft 14, and an intake nose 16 protruding from the hallow shaft 14 is set at the front end of the inner engine case 15 regarding to the intake direction. An intake way 17 connecting to the intake end 11 is formed between the intake nose 16 and the outer engine case 10. A burner 18 having a can-shaped combustion chamber is formed at the latter portion of the inner engine case 15. A fuel supply device set in the inner engine case 15 comprises a fuel piping 19, a fuel pressure blade 20, a fuel sprayer 21 and an electromagnetic valve 22. The electromagnetic valve 22 drives the fuel pressure blade 20 and the fuel sprayer 21 to make fuel pressured, atomized and sprayed into the burner 18 for combustion. A compressor connecting to the intake way 17 is composed of a several compressor rotor blades 24 and several compressor stator blades 25, wherein the front are set around the interior circular surface of the revolving shaft 14 while the later are set around the exterior circular surface of the inner engine case 15. A turbine is composed of several turbine rotor blades 26 and several turbine stator blades 27, wherein the front are set around the interior circular surface of the revolving shaft 14 while the later are set around the exterior circular surface of the outer engine case 15. The turbine is set at the rear side of the compressor regarding to the intake direction. A heat exchanger 28 is set between the compressor and the turbine. The heat exchanger 28 can connect to the can-shaped combustion chamber of the burner 18 through first holes 29 of the inner engine case 15, and also can connect to the exhaust way 30 formed between the hollow revolving shaft 14 and the outer engine case 10 through the second holes 30 set on the hollow revolving shaft 14. An electric generator 34 is set at the interior circular surface of the outer engine case 10 and set at the cold portion of the exterior circular surface of the hollow revolving shaft 14.

The hollow revolving shaft 14 can be suspended and supported at the interior circular surface of the outer engine case 10 by several air bearings 35. The air bearings 35 not only have functions of holding thrust and loading but also have no cumbersome lubrication problems, and correspond to environmental protection.

Figure 2:
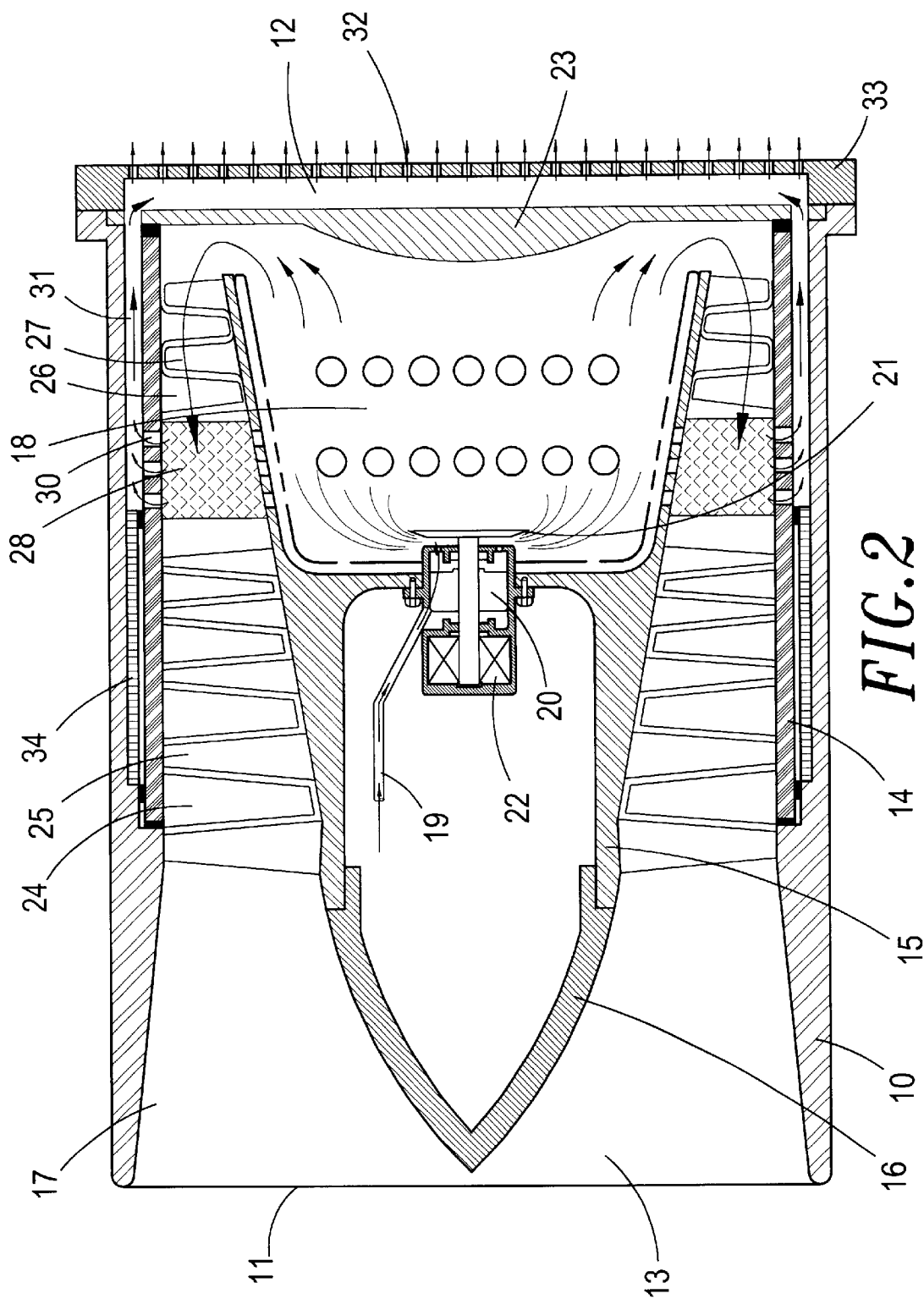
FIG. 2 is like FIG. 1, and is the axial sectional diagram of the present invention, a gas turbine engine, under combustion and exhaust process.

The thermal cycle and detailed flowing path of the fluid of the present invention, a gas turbine engine, are shown in FIG. 1 and FIG. 2.

The arrows shown in FIG. 1 illustrate the intake process. Air enters the compressor through the intake way 17, and then the air becomes high-pressure air due to work of the compressor rotor blades 24 and expansion effect of the compressor stator blades 25. The high-pressure air then flows into the heat exchanger 28. After increasing temperature, the high-pressure air enters the can-shaped burner 18 through the first holes 29. At this moment, part of air enters main combustion zone of the burner 18 to be mixed with the atomized fuel from the fuel sprayer 21 and be burned to produce high-temperature and high-pressure gas. Part of air enters the dilution zone for reducing the temperature of gas to ensure that parts of the hot portion keep on working under the limitation of the material.

The arrows shown in FIG. 2 illustrate thermal cycle and exhaust part. The gas having high temperature and high pressure resulted from combustion process of the burner 18 is sealed by the cover 23 of the hollow revolving shaft 14, and is directed into the turbine. The turbine stator blades 27 are used to increase the speed of gas combustion and guide the flow angle of gas for entering the turbine blades 26. When passing through the turbine rotor blades 26, the gas release energy and drive the hollow revolving shaft 14 which produce work for keeping rotation of the compressor rotor blades 24 and cutting the magnetic line of force of the electric generator 34 to produce electric energy output. Then, the gas enters the heat exchanger 28, and transfers redundant heat to the air passing through the compressor by thermal conduction. Lastly, the gas passes through the second holes 30, exhaust way 31, and exhaust cover 33 to be drained away to atmosphere. The thermal cycle of the present invention is finished.

In the engine configuration of the present invention, compressor rotor blades and turbine rotor blades are set around the interior circular surface of the revolving shaft, and compressor stator blades and turbine stator blades are set inside the shaft. The design has been a great innovation and a breakthrough in the technology field since a turbine engine was invented and applied. The benefits from the design are:

1) A burner can be set inside the revolving shaft, and a traditional can-shaped combustion chamber can be designed to reduce usage room. Besides, the burner is enclosed entirely in the revolving shaft to avoid heat loss effectively.

2) Because the blades are set around the interior surface of the revolving shaft, the diameter of the revolving shaft become larger. In this way, the revolving shaft is not easy to deform, and the critical rotation speed can be advanced for one order. The revolving shaft can be operated under critical rotation speed with one more order while stability of the system is kept.

3) Clearance between the rotor blades and the stationary parts is near the center of the axes, so the area of the clearance is substantially reduced such that traditional limitation of design can be overcome and the efficiency of the compressor and the turbine can be increased.

4) The rotor blades are enclosed inside the revolving shaft, so the intensity of stress is increased. The turbine rotor blades can be made of ceramic material, and the efficiency of the system can be increased substantially.

5) The bearing is located at the exterior surface of the revolving shaft, which belongs to the low-temperature zone, to increase the life of the bearing. Besides, air bearings can be used to get the benefits of economics and environmental protection.

6) An electric generator can be set at the cold portion at the exterior surface of the revolving shaft to achieve a compact design.

7) Comparing with other engines having the same power, the total volume of the engine of the present invention can be substantially reduced.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A turbine engine rotor configuration, which comprises:
   a compressor composed of a compressor rotor and a stator, wherein a plurality of compressor rotor blades are set and distributed around an interior surface of a hollow revolving shaft to be driven and rotated by said revolving shaft while a plurality of compressor stator blades are set and distributed around an exterior circular surface of an inner stationary engine case inside said revolving shaft;
   a turbine composed of a turbine rotor and a stator, wherein a plurality of turbine rotor blades are set and distributed around said interior circular surface of said hollow revolving shaft to drive and to rotate said revolving shaft while a plurality of turbine stator blades are set around said exterior circular surface of said inner engine case inside said revolving shaft;
   a can-shaped burner, which is set inside said inner engine case and inside said hollow shaft.

2. A gas turbine engine, which comprises:
   an outer engine case having a central channel, wherein a first end is an intake end while a second end is an exhaust end;
   a hollow revolving shaft which is supported interior to a circular surface of said outer engine case;
   an inner engine case which is supported inside said hollow revolving shaft, an intake nose protruding from said hollow revolving shaft being set at a front end of said inner engine case facing to an intake direction, an intake channel being formed between said intake nose and said outer engine case to direct air into said turbine engine, a rear portion of said inner engine case serving as can-shaped burner;

a compressor, which is connected to said intake channel to compress outside air as high-pressure air and is composed of a plurality of said compressor rotor blades and a plurality of said compressor stator blades, said compressor rotor blades being set around said interior circular surface of said revolving shaft to be driven and rotated by said revolving shaft while said compressor stator blades being set on said inner engine case;

a fuel supply device fastened inside said inner engine case, which is used to spray fuel to said burner to be mixed with said high-pressure air for combustion for producing a gas with high temperature and pressure; and a turbine composed of a plurality of turbine rotor blades and a plurality of turbine stator blades, wherein said turbine rotor blades are set around said interior circular surface of said revolving shaft to drive and to rotate said revolving shaft while said turbine stator blades are set on said inner engine case.

3. A gas turbine engine as recited in claim 2, wherein an electric generator is set on said interior surface of said outer engine case and set on an exterior circular surface of said hollow revolving shaft, and is driven by said hollow revolving shaft to produce electric power for output.

4. A gas turbine engine as recited in claim 2, wherein said hollow shaft is suspended inside said interior circular surface of said outer engine case by a plurality of air bearings locating at an exterior circular surface of said revolving shaft.

5. A gas turbine engine as recited in claim 2, wherein an exhaust cover having a plurality of exhaust holes covers said exhaust end of said outer engine case.

6. A gas turbine engine as recited in claim 2, wherein a heat exchanger is set between said compressor and said turbine, and is used to heat high-pressure air passing through said compressor and direct said heated high-pressure air to enter said burner for combustion, and is also used to absorb redundant heat of gas passing through said turbine and direct said gas to exhaust.

7. A gas turbine engine as recited in claim 2, wherein said fuel supply device comprises a fuel piping, a fuel pressure blade, a sprayer and an electromagnetic valve, said electromagnetic valve simultaneously driving said fuel pressure blade and said sprayer to make fuel pressured, atomized, and sprayed into said burner for combustion.

* * * * *